Aug. 19, 1924.  
J. D. HALE  
BUMPER  
Filed Sept. 10, 1923  
1,505,140
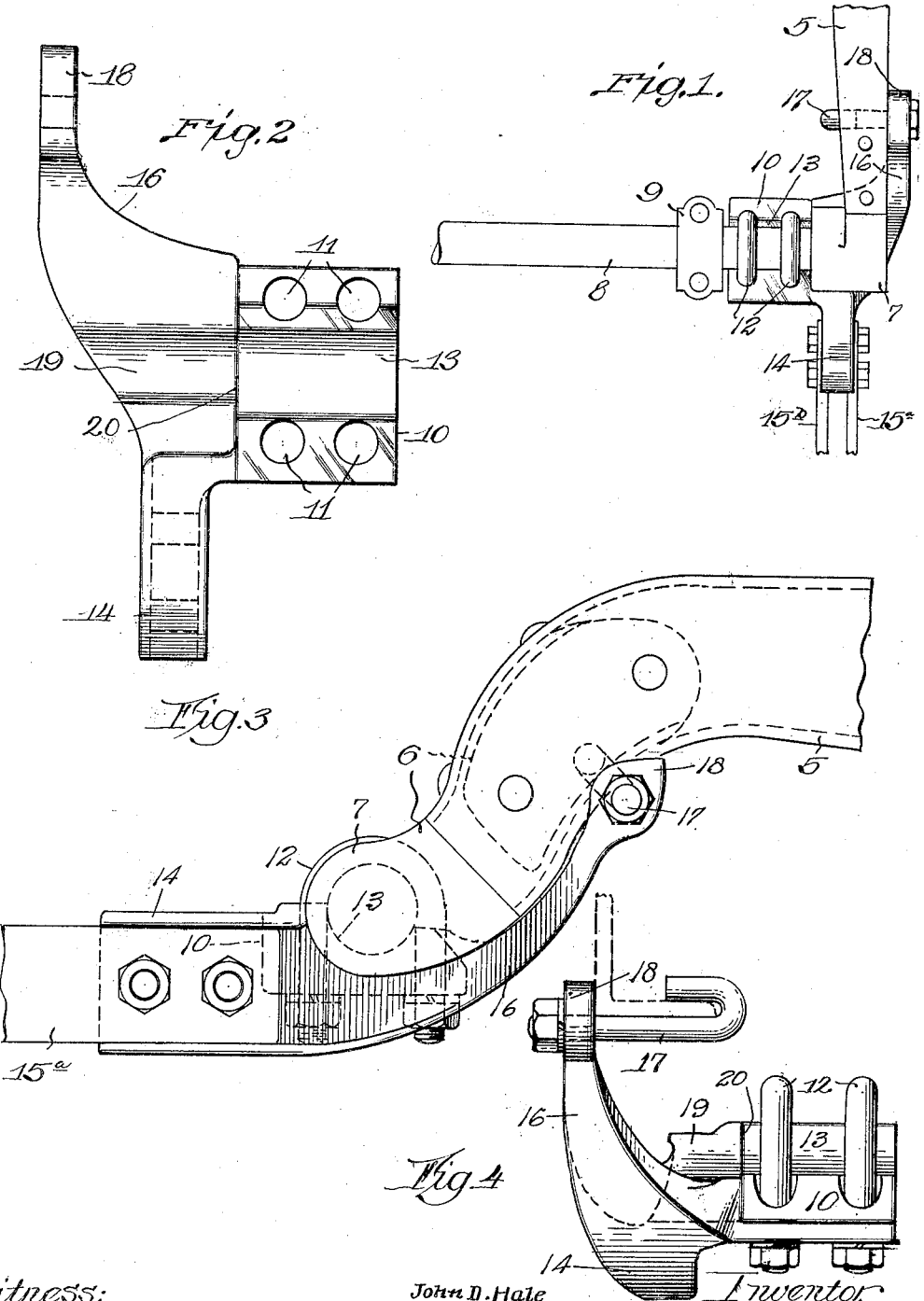
John D. Hale Inventor Patented Aug. 19, 1924.

1,505,140

UNITED STATES PATENT OFFICE.

JOHN D. HALE, OF CHICAGO, ILLINOIS, ASSIGNOR TO STAFFORD SALES COMPANY, OF CHICAGO, ILLINOIS, A CORPORATION OF ILLINOIS.

BUMPER.

Application filed September 10, 1923. Serial No. 661,929.

*To all whom it may concern:*

Be it known that I, JOHN D. HALE, a citizen of the United States, and a resident of Chicago, in the county of Cook and State of Illinois, have invented certain new and useful Improvements in Bumpers, of which the following is a full, clear, and exact description, such as will enable others skilled in the art to make and use the same.

My present invention relates to improvements in bumpers or fenders for use upon automobiles and similar motor-driven vehicles, and it has more particular reference to the provision of a substantial and dependable means in the form of a bracket for attaching or connecting the inwardly extending arms of the bumper to the vehicle.

In automobiles of certain types it is the practice to provide suitable castings at the outer ends of the longitudinally extended end portions of the side-sills forming a part of the chassis, which castings are bolted, riveted, or otherwise secured to said sills usually between the upper and lower flanges of the channel metal of which said sills are formed. Also it is the practice to connect these castings or brackets by a transverse cross rod or bar, and frequently a spare-tire rack or luggage shelf is mounted upon this cross rod or bar.

I have utilized the foregoing structure for a support for the bumper attaching bracket that I have herein disclosed, and in this connection I have devised a bracket that will be clamped to the cross rod and to the horn of the chassis side-sill at separated locations so that the bumper will be both conveniently and firmly mounted with respect to the chassis and avoid vibration which eventually loosens the connecting or clamping bolts and freequently results in serious damage when an end or arm of the bumper is released or dropped from the vehicle.

The divers objects of my invention reside in providing a bumper attaching bracket that is extremely simple in construction so that it will be relatively inexpensive to fabricate and can be made in a one-piece casting and therefore will not add materially to the retail price of the bumper; that may be readily installed upon the motor vehicle by unskilled persons without the use of special tools; and which is novel in construction and is dependable and efficient in its operation.

I prefer to carry out my invention and accomplish the foregoing and other objects by means of the structure which will be hereinafter fully described and which is more particularly pointed out in the appended claims, reference being now had to the accompanying drawings that form a portion of this specification.

In the drawings:

Figure 1 is a top plan of my bracket detached.

Figure 2 is a top plan of the rear right hand end portion of a chassis frame of a Buick type of motor vehicle showing my bracket installed thereon.

Figure 3 is a longitudinal side elevation of the structure shown in Figure 2 and drawn to an enlarged scale.

Figure 4 is an end view of the attaching bracket dismantled from the vehicle and looking at the same from the right-hand end of Figure 3.

Referring to the drawings, that illustrate a typical or preferred embodiment of my invention, I have designated similar parts by the same reference characters wherever the said parts occur throughout the several views.

The longitudinally extending side-sills 5 of the automobile chassis are formed of U-section or channel-metal with the connecting web vertically disposed and the end of the sill is curved downwardly, and a terminal casting 6 is inserted between the flanges of the sill and suitably secured thereto. The outer end of the casting 6 is enlarged to provide a cylindrical shaped boss 7 that is horizontally bored to receive the end of the cross rod or bar 8 that connects the rear ends of the respective side-sills of the chassis frame and to which is secured a suitably shaped clamping device 9 for mounting a spare wheel or tire. The above described elements are standard construction on the type of motor vehicle hereinbefore mentioned and therefore form no portion of my invention.

As seen in Figure 1 of the drawings my attaching bracket preferably comprises a casting of tridentate form one of the arms of which is a substantially rectangularly shaped block 10 provided with transverse vertical apertures 11 to receive the parallel arms of U-shaped clips 12 that surround the cross rod 8 and clamp the latter into a concave recess or channel 13 extending longitudinally of the block and radially from the point of juncture of the three arms of said brackets. Another arm 14 of substantially I-shape in transverse section (or double channel shaped) is disposed with its web vertical and at substantially a right-angle to the block or arm 10, and the channels upon opposite faces of this arm 14 afford means for receiving the end horizontal portions of the two arms 15ª and 15ᵇ of the bumper structure the details of which are not shown but which may be of any suitable construction according to the requirements of the installation, and may be bolted or otherwise suitably secured to said arm 14. Extending obliquely away and curved upwardly from the juncture of the arms 10 and 14 is the third arm 16 of the tridentate shaped attaching bracket. The curvature of this arm 16, as seen in Figure 3 of the drawings substantially conforms with the shape of the adjacent end portion of the chassis horn against the under portion of which it is positioned and is clamped in place by means of a J-bolt 17 that passes through an aperture in the upper outer end of said arm and which bolt has its hooked end engaged with the lower flange of the side-sill 5 as seen in Figure 4 of the drawings. For the purpose of preventing the bending or distorting of the arm 16 laterally when the J-bolt is tightened into position the portion of said arm surrounding the bolt aperture is enlarged as at 18 so that the adjacent face thereof will engage with the vertical face of the side-sill and be clamped there-against. The portion of the casting forming this bracket at the juncture of the arms is depressed to form a saddle 19 in which the boss 7 seats, and said saddle is lower than the recess 13 so as to provide a shoulder 20 against which one end of the boss abuts when the structure is assembled with the end or horn of the side-sill.

From the foregoing it will be seen that when the bracket with the bumper arms 15ª and 15ᵇ attached thereto is mounted upon the vehicle the same is carried rigidly by the U-shaped clips 12 on the cross rod 8 and the structure is maintained against lateral movement both vertically and horizontally by the arm 16 which is rigidly connected with the chassis sill by the J-bolt 17. It will be obvious, however, that divers changes or modifications of the structure I have herein shown and described may be made without departing from the principle of my invention. I therefore desire it understood that all such changes or modifications are fully contemplated as coming within the scope of the appended claims.

What I claim is:

1. A bumper attaching bracket comprising a tridentate structure one of the arms thereof being provided with a recess radial from the juncture of the arms, a second arm of said structure extending upwardly from the juncture of the arms, and a third arm formed with a recess in a vertical face to receive an adjacent portion of a bumper.

2. A bumper attaching bracket comprising an arm provided with a recess in its upper face, a bumper receiving arm extending laterally therefrom, and a bracing arm extending oppositely to the last-named arm and curved upwardly and outwardly, and offset to the plane of the bumper-receiving arm whereby to fit under a portion of the member to which it is secured and to extend along a side thereof.

3. A bumper attaching bracket comprising three integral arms making a common juncture, one of said members provided with a recess in its upper face, a second of said members disposed at a right angle to the first-mentioned member and channeled to receive a portion of a bumper, and the third of said members curved upwardly and tapered to a point above the horizontal planes of the first two members.

4. In combination with an automobile chassis having side-sills extended to form horns, and a cross rod extending between said horns, of a bumper attaching bracket comprising three integral members making a common juncture, one thereof being recessed to receive said cross rod, another thereof being extended at a right angle to the recessed member to receive a portion of the bumper, and the third thereof being extended obliquely with respect to the other members to a point of engagement with a side-sill.

5. A bumper attaching bracket comprising a tridentate structure one of the arms thereof being provided with a recess radial from the juncture of said arms, a second arm of said structure extending upwardly from the juncture of said arms, a third arm formed with a recess in a vertical face to receive an adjacent portion of a bumper, and said structure at the point of juncture of said arms provided with a saddle to receive a portion of the vehicle chassis frame.

6. A bumper attaching bracket comprising a unitary structure formed with three radial arms, one of said arms provided with a longitudinal recess in its upper face, the second arm having a recess in a vertical face to receive a portion of a bumper, the third arm curved upwardly from the juncture of said arms, the first and second arms being arranged at right angles to each other, and said structure at the point of juncture of said arms provided with a recess and a lateral shoulder arising therefrom.

7. A bumper attaching bracket comprising an arm provided with a recess in its upper face, a bumper receiving arm extending laterally therefrom, a bracing arm extending oppositely to the last-mentioned arm and curved upwardly, and said structure at the juncture of said arms provided with a saddle to receive a portion of the vehicle chassis frame.

8. A bumper attaching bracket comprising an integral three-arm structure making a common juncture, one of the arms constructed to be clipped to a transverse element of the chassis frame, another of said arms secured to a portion of the bumper, the third of said arms curved upwardly to a point above the horizontal planes of the first two arms, and said structure at the point of juncture of said arms provided with a saddle and a shoulder arising therefrom.

Signed at Chicago, county of Cook and State of Illinois, this 31st day of August, 1923.

JOHN D. HALE.